Oct. 25, 1955                G. R. TREMOLADA                2,721,748
POLISH ROD PACKING DEVICE
Filed Feb. 3, 1951
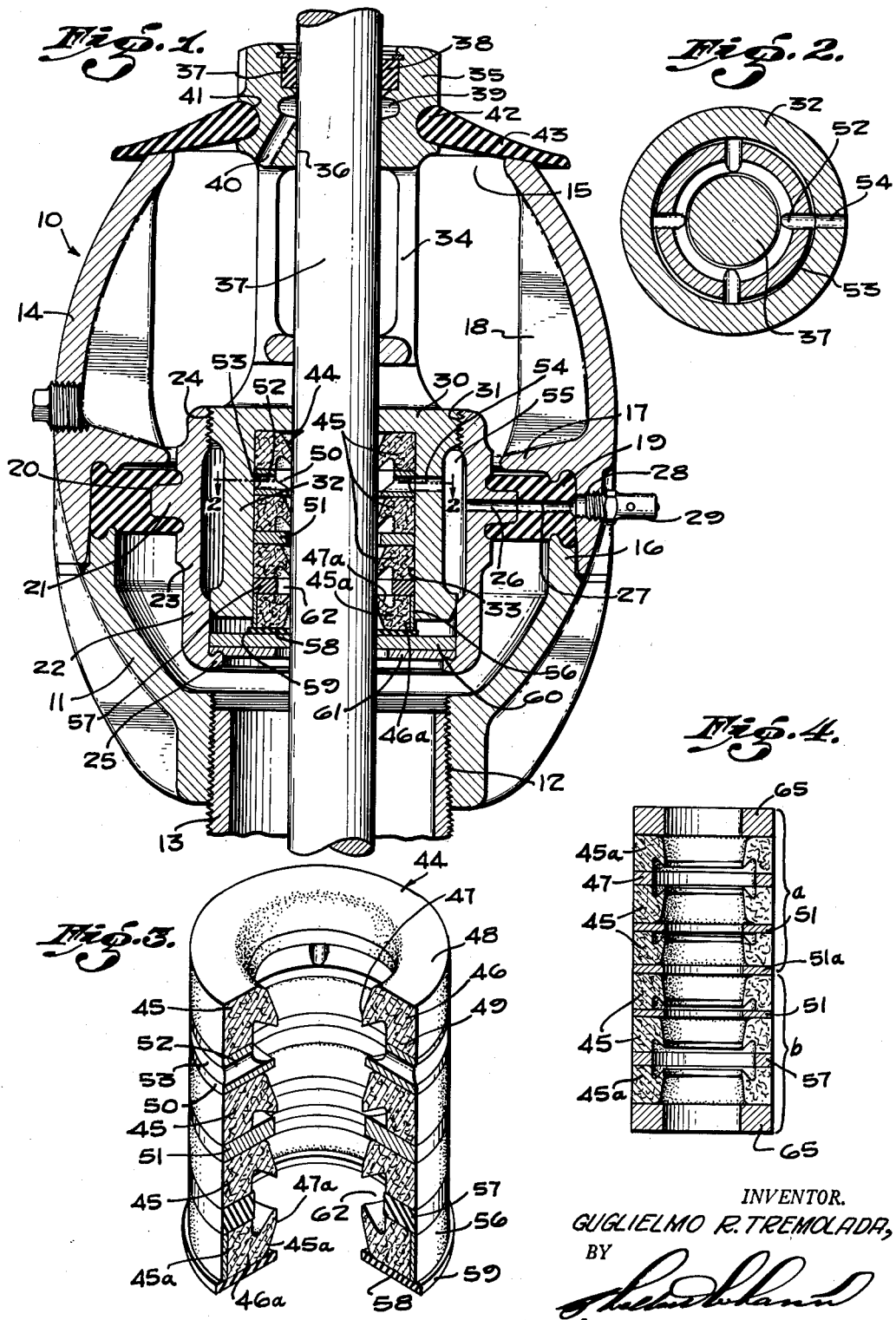
INVENTOR.
GUGLIELMO R. TREMOLADA,
BY
ATTORNEY.

United States Patent Office 2,721,748
Patented Oct. 25, 1955

2,721,748

POLISH ROD PACKING DEVICE

Guglielmo R. Tremolada, Los Angeles, Calif., assignor to Emsco Manufacturing Company, a corporation of California Application February 3, 1951, Serial No. 209,303

5 Claims. (Cl. 286—15)

My invention relates in general to packing means for rods, tubes or shafts which project through a wall from a zone of higher pressure to a zone of lower pressure, and relates in particular to a simple and effective packing unit used in conjunction with various cylindrical members and which is especially adapted for sealing around a polished rod employed in pumping equipment.

It is an object of the invention to provide, for use upon the upper end of an oil tubing disposed in a well, a polished rod stuffing box having as a part thereof a packing unit which will effectively seal around the polished rod, will last for a long period of time without need for replacement, and which may be readily replaced.

It is an object of the invention to provide a packing unit comprising a plurality of packing rings connected together in coaxial relation, each of these packing rings having an annular body portion of relatively hard or rigid construction, with an annular lip extending conically from the rear portion of the annular body toward the surface of the cylindric member to be sealed and toward the front end of the annular body, one of these rings being disposed so that the lip thereof is directed rearwardly while the remaining packing rings are disposed with their lips directed forwardly, or against the pressure of the fluid which is to be retained in the zone of higher pressure by the packing unit.

It is an object of the invention to provide a packing unit having a plurality of packing rings of the character set forth in the preceding paragraph, with the lips thereof all directed toward the front end of the packing unit, and an oil retaining or trap ring at the front end of the plurality of rings, to complete the packing unit, all of the aforementioned rings being secured together so as to provide a unitary packing structure which may be inserted in a packing chamber. One of the features of a preferred form of my invention is that a ring at one end of the packing unit has an enlargement which prevents placing the packing unit in the chamber in reversed position.

A further object of the invention is to provide a simplified stuffing box or a sucker rod having a packing unit carried by a packing box which is supported in such a manner that it may have a small universal movement so as to align with the polished rod.

It is a further object to provide a stuffing box arrangement of the character set forth in the preceding paragraph having a wiper supported by an extension from the member which forms the adjustably mounted packing chamber, instead of being supported by the outer housing of the stuffing box structure.

Further objects and advantages of the invention may be brought out in the following part of the specification, wherein I have for the purpose of making a detailed disclosure described a structure embodying the invention, without intent to limit the scope of the invention set forth in the appended claims or to limit the range of equivalents to which these claims are entitled.

Referring to the drawing which is for illustrative purposes only:

Fig. 1 is a sectional view showing a packing unit and stuffing box according to my present invention;

Fig. 2 is a cross-section taken on a plane indicated by the line 2—2 of Fig. 1;

Fig. 3 is an isometric view, to enlarged scale, of the packing unit shown in Fig. 1; and Fig. 4 is a sectional view showing an alternative form of the invention.

In Fig. 1 I show a simplified stuffing box having a housing 10 of generally globular form having a lower part 11 equipped with a threaded opening 12 so that there may be screwed upon the upper end of a tube 13 constituting the upper portion of a string of oil tubing in a well, and an upper part 14 having therein a circular opening 15 axially aligned with the threaded opening 12. The lower part of 11 has an annular wall 16 which fits into the lower part of the upper portion 14, and spaced upwardly from the annular wall 16. The upper portion has an inwardly extending annular wall 17 reenforced by a number of internal ribs 18.

A supporting ring 19 of rubbery material is gripped between the parts 16 and 17. This ring 19 has an inwardly faced channel 20 to receive a rib 21 which projects radially from an intermediate portion of a packing chamber case 22 having a generally cylindric wall 23 with internal threads 24 at its upper end and an inwardly turned lip 25 at its lower end. The ring 19 is preferably molded upon the case 22 so that the rubbery material of the ring 19 will be bonded to the metal surface of the case 22 which it engages. The case 22 has a radial opening 26 communicating with a radial opening 27 in the ring 19, which opening 27 in turn communicates with an opening 28 in the housing 10 equipped with a grease fitting 29.

The case 22 supports a packing device 30 having an externally threaded portion 31 at its upper end for engagement with the internal threads 24 of the case 22. The packing device 30 includes a cylindric wall 32 defining a packing chamber 33 which is open at its lower end. The packing device 30 includes an upwardly extending structure 34 which supports an aligning body 35 in such position that it will project upwardly from the opening 15 of the housing 10. This body 35 has a bore 36 through which a cylindrical member 37 in the form of a polished rod extends, a cavity 37 to receive a wiping ring 38, an oil collecting channel 39 below the wiping ring 38 and a duct 40 connecting the channel 39 with the interior of the upper part 14. The body 35 has an external channel 41 to receive the inner portion 42 of an annular cover plate 43 of rubbery material, such as a rubber compounds, arranged to cover the opening 15 and engage the upper annular extremity of the housing 10.

In the packing chamber 33 there is a packing unit 44 comprising a plurality of packing rings 45 which are faced forwardly and a packing ring 45a which is disposed at the front end of the plurality or group of rings 45, but is faced rearwardly. The lower end of the packing unit 44 is regarded as the front end of the packing unit for the reason that it is spaced toward the pressure of fluid in the tube 13 and the internal space of the lower part 11 of the housing 10. Therefore the upper end of the packing unit 44 is at its rear end.

Each of the packing rings 45 comprises an annular body 46 and an annular sealing lip 47. Considering that the lip 47 of a packing ring 45 is faced forwardly, then the annular body 46 of the packing ring may be said to have a rear base 48 and a front base 49, and with respect to the plurality of rings 45, it will be perceived that the rear face of each succeeding ring is disposed in spaced relation to the front face of the preceding ring. Each lip 47 of an annular packing member 45 projects conically forwardly and toward the surface of the polished rod 37.

Between the respective packing rings 45 there are metal supporting rings 50 and 51. The ring 50 which is adjacent the front face of the upper ring 45 has radial openings 52 communicating with an external groove 53. In the cylindric wall 32 of the packing member 30 there is a lubricant duct 54 which connects the groove 53 with the space 55 surrounding the wall 32 within the case 22. Grease injected through the fitting 29 may thus pass through the ducts 27 and 33, the space 55 and the ducts 54 and 52 into the space around the polished rod 37 below the uppermost lip 47. From this upper space the grease passes downwardly along the surface of the polished rod 37 into the downwardly succeeding annular spaces which are formed within the packing unit 44.

The ring 45a is substantially the same form as the rings of 45. It has an annular body 46a surrounded by a thin walled metal sleeve 56, and a lip 47a which is directed forwardly with respect to the rear and front faces of the annular body 46a, but, in view of the fact that the ring 45a is in reversed position, the lip 47a is directed rearwardly with respect to the packing unit 44. Between the packing ring 45a and the lower packing ring 45 there is a spacing ring 57 of softer rubbery material so that this ring 57 will yield in axial direction and store up energy tending to expand the packing unit axially. At the extreme lower end of the packing unit 44 there is a metal ring 58 which supports the rear end face of the packing ring 45a. This ring 58 has at least one radially projecting portion 59 which will prevent the packing unit 44 from entering the packing chamber 33, therefore preventing entry of the packing unit 44 into the chamber 33 in reversed direction.

The packing unit 44 is of greater axial dimension than the chamber 33 so that a portion of the packing ring 45a projects from the lower end of the chamber 33. This allows for axial compression of the packing unit 44 when the cylindric wall 32 of the packing device 30 is screwed down into the case 22 so that the ring 58 at the lower end of the packing unit 44 bears against an annular wall 60 which serves as a removable closure for the lower end of the case 22. A washer 61 of yieldable material is placed between the annular wall 60 and the lip 25 to effect a seal.

The inverted packing ring 45a at the lower end of the packing unit 44 forms at lower end of the packing unit, around the surface of the polished rod 37, an oil chamber 62 in which oil is trapped so as to effect a better lubrication of the polished rod 37 as it passes through the packing unit 44. The alternative form of my packing unit shown in Fig. 4 is especially adapted for use in deep well reciprocating pumps and especially in those pumps of small diameter known as "stripper" pumps. The packing unit shown in Fig. 4 is in effect a pair of units a and b directed oppositely from a central supporting ring 51a. Each of these portions a and b comprises a number of forwardly faced packing rings 45 and a reversed packing ring 45a constituting lubricant trap rings at the front ends of the assemblies of rings 45. Each trap ring 45a is spaced from its adjacent ring 45 by a ring 57. At the ends of the composite packing unit shown in Fig. 4 there are sealing rings 65 made of a rubbery material which will deform to a reasonable extent when axial compression is applied to the packing unit. The rings of the packing unit 44 are secured together in the relation in which they have been described so that these rings may be handled as a single unit wherein the component parts are properly placed. In the preferred practice of the invention the rings of the unit 44 are secured together by layers of cement disposed between adjacent bases of the rings. The rings 45, 45a, 51, 51a and 57 of the packing unit shown in Fig. 4 are secured together by means consisting of layers of cement disposed between the adjacent bases of these rings. Ordinarily the rings 65 are cemented unto the trap rings 45a, but this practice need not always be followed.

I claim:

1. In a polished rod packing device of the character described: a housing adapted to be connected to the upper end of an oil tube, said housing having an upwardly faced opening in the upper end thereof; a resilient supporting ring carried in said housing between the upper and lower extremities thereof; a cylindric case supported in said housing by said resilient supporting ring; a packing member removably secured in said case, said packing member having an upwardly projecting structure; an aligning body supported on said structure having a wall to engage the surface of the polished rod at a point spaced from the packing member and having a wiping ring to remove oil from the polished rod and duct means for conducting the oil into the upper portion of the housing; and a cover member supported on said body in a position to close the opening in the upper end of said housing.

2. In a packing device of the character described: a housing adapted to be connected to the upper end of an oil tube, said housing comprising upper and lower parts connected together along a median horizontal plane and having an upwardly faced opening in the upper end thereof; a resilient supporting ring in said housing between the upper and lower extremities thereof, the peripheral portion of said supporting ring being held between the upper and lower parts of said housing; a cylindric case in said housing engaging the inner annular portion of said supporting ring so as to be resiliently supported thereby; a packing member removably secured in said case, said packing member having an upwardly projecting structure; a body supported on said structure having a wiping ring to remove oil from the polished rod and duct means for conducting the oil into the upper portion of the housing; and a cover member supported on said body in a position to close the opening in the upper end of said housing.

3. In a packing device of the character described: a housing adapted to be connected to the upper end of an oil tube, said housing comprising upper and lower parts connected together along a median horizontal plane and having an upwardly faced opening in the upper end thereof; a resilient supporting ring in said housing between the upper and lower extremities thereof, the peripheral portion of said supporting ring being held between the upper and lower parts of said housing; a cylindric case in said housing engaging the inner annular portion of said supporting ring so as to be resiliently supported thereby; a rod packing means supported in said case; and a cover member supported on said body in a position to close the opening in the upper end of said housing.

4. In a packing device of the character described: a housing adapted to be connected to the upper end of an oil tube, said housing comprising upper and lower parts connected together along a median horizontal plane and having an upwardly faced opening in the upper end thereof; a resilient supporting ring in said housing between the upper and lower extremities thereof, the peripheral portion of said supporting ring being held between the upper and lower parts of said housing; and a cylindric case in said housing engaging the inner annular portion of said supporting ring so as to be resiliently supported thereby, there being connected lubricant passages in said housing, said supporting ring and said case for conveying lubricant to said rod packing means.

5. In a polished rod packing device of the character described: a housing adapted to be connected to the upper end of an oil tube, said housing having an upwardly faced opening in the upper end thereof; a resilient supporting ring carried in said housing between the upper and lower extremities thereof; a cylindric case supported in said housing by said resilient supporting ring so as to have aligning movement; a packing member removably secured in said case, said packing member having an upwardly projecting structure; and an aligning body supported on said structure having a wall to engage the surface of the polished rod at a point spaced from the packing member and having a wiping ring to remove oil from the polished rod and duct means for conducting the oil into the upper portion of the housing.

References Cited in the file of this patent

UNITED STATES PATENTS

| | | |
|---|---|---|
| 1,885,046 | Bennett | Oct. 25, 1932 |
| 2,006,529 | Wheeler | July 2, 1935 |
| 2,041,316 | Bennett | May 19, 1936 |
| 2,196,676 | Johnson et al. | Apr. 9, 1940 |
| 2,219,064 | Boyer et al. | Oct. 22, 1940 |
| 2,256,343 | Hubbard | Sept. 16, 1941 |
| 2,451,269 | Allen et al. | Oct. 12, 1948 |
| 2,470,960 | Tremolada | May 24, 1949 |